(12) United States Patent
Wang et al.

(10) Patent No.: US 11,014,576 B2
(45) Date of Patent: May 25, 2021

(54) BEIDOU-BASED GRID AUGMENTATION AUTONOMOUS DRIVING MULTI-LEVEL WARNING SYSTEM

(71) Applicant: Beihang University, Beijing (CN)

(72) Inventors: Zhipeng Wang, Beijing (CN); Yanbo Zhu, Beijing (CN); Yuan Liu, Beijing (CN); Jingtian Du, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 190 days.

(21) Appl. No.: 16/058,063

(22) Filed: Aug. 8, 2018

(65) Prior Publication Data

US 2020/0031367 A1    Jan. 30, 2020

(30) Foreign Application Priority Data

Jul. 27, 2018  (CN) .......................... 201810840721.1

(51) Int. Cl.
| | | |
|---|---|---|
| *G01S 19/07* | (2010.01) | |
| *B60W 50/14* | (2020.01) | |
| *G01S 5/14* | (2006.01) | |
| *G01S 19/41* | (2010.01) | |
| *G01S 19/46* | (2010.01) | |
| *G05D 1/00* | (2006.01) | |
| *G05D 1/02* | (2020.01) | |

(52) U.S. Cl.
CPC ............. *B60W 50/14* (2013.01); *G01S 5/145* (2013.01); *G01S 19/41* (2013.01); *G01S 19/46* (2013.01); *G05D 1/0088* (2013.01); *G05D 1/028* (2013.01); *G05D 1/0278* (2013.01); *B60W 2050/143* (2013.01); *G05D 2201/0213* (2013.01)

(58) Field of Classification Search
CPC . B60W 50/14; B60W 2050/143; G01S 19/41; G01S 5/145; G01S 19/46; G05D 1/028; G05D 1/0088; G05D 1/0278; G05D 2201/0213
See application file for complete search history.

(56) References Cited

U.S. PATENT DOCUMENTS

| | | | | |
|---|---|---|---|---|
| 6,226,570 | B1 * | 5/2001 | Hahn ................... | B60K 28/066 701/1 |
| 2001/0035840 | A1 * | 11/2001 | Fenton ................. | G01S 5/0036 342/357.21 |
| 2002/0175855 | A1 * | 11/2002 | Richton ............... | G01S 5/0252 342/357.29 |
| 2009/0027264 | A1 * | 1/2009 | Chen ...................... | G01S 19/04 342/357.27 |

(Continued)

*Primary Examiner* — Christian Chace
*Assistant Examiner* — Jordan S Fei
(74) *Attorney, Agent, or Firm* — Locke Lord LLP; Tim Tingkang Xia, Esq.

(57) ABSTRACT

The present invention provides a BeiDou-based grid augmentation autonomous driving multi-level warning system comprising a Beidou Satellite Ground-based Augmentation system, user terminals and a Vehicles internet system, wherein the Beidou Satellite Ground-based Augmentation system comprises Beidou grid reference stations, a data processing system and a data broadcast system; the user terminal comprises an in-vehicle receiver and a calculating chips. The present invention can reduce the occurrence of traffic accidents and reduce the loss of life and property.

7 Claims, 4 Drawing Sheets

(a)

(b)

(56) References Cited

U.S. PATENT DOCUMENTS

| | | | |
|---|---|---|---|
| 2013/0332072 A1* | 12/2013 | Janky | G01S 19/07 |
| | | | 701/469 |
| 2015/0149059 A1* | 5/2015 | Choi | B60W 30/146 |
| | | | 701/96 |
| 2016/0049079 A1* | 2/2016 | Ibrahim | G08G 1/005 |
| | | | 340/944 |
| 2017/0123072 A1* | 5/2017 | Miya | G01S 19/25 |

* cited by examiner

BEIDOU-BASED GRID AUGMENTATION AUTONOMOUS DRIVING MULTI-LEVEL WARNING SYSTEM

CROSS-REFERENCE TO RELATED PATENT APPLICATION

This application claims priority to and the benefit of, pursuant to 35 U.S.C. § 119(a), patent application Serial No. CN201810840721.1 filed in China on Jul. 28, 2018. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to the technical field of integrity monitoring in satellite navigation technologies, and particularly to a BeiDou-based grid augmentation autonomous driving multi-level warning system.

BACKGROUND

Figure 1:
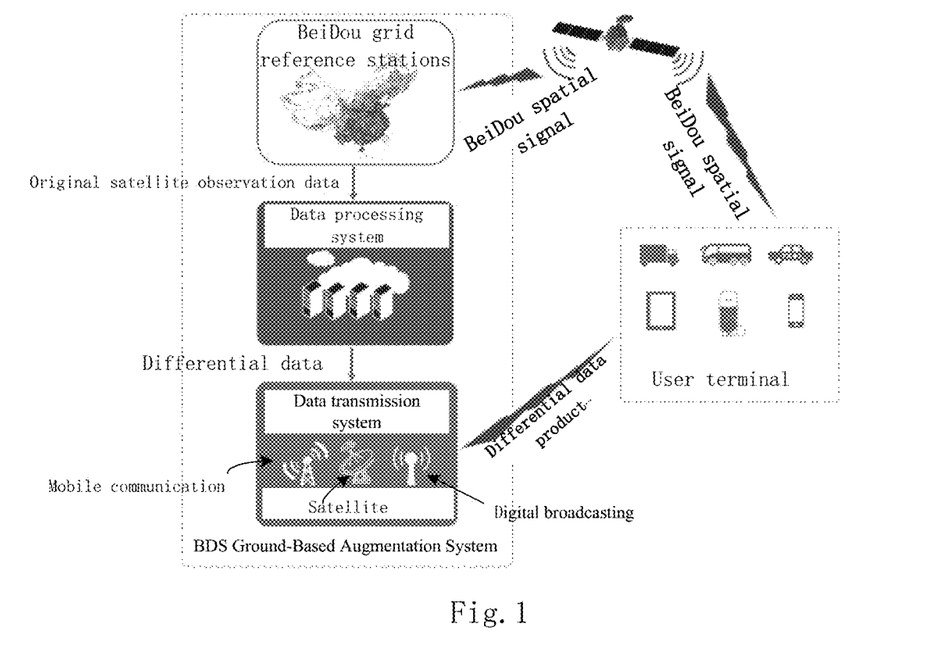
FIG. 1 schematically shows a principle diagram of the BeiDou-based grid augmentation autonomous driving multi-level warning system provided by the present invention.

The Global Navigation Satellite System (GNSS) technology can provide stable and accurate location information for people all over the world and has been widely applied to various fields. FIG. 1 shows a principle diagram of a BeiDou Satellite Ground-Based Augmentation System (BDS GBAS). The BDS Ground-Based Augmentation System is an augmentation system for service precision and integrity of the BeiDou satellite navigation system. The land of mainland China is gridded, and a BeiDou high-precision satellite navigation receiver is installed at each grid node to receive a BeiDou signal and transmit, in real time through a communication network, the signal to a national data integrated processing system, which processes the signal and generates such data products as precise satellite orbit, clock difference, ionosphere, comprehensive corrections, and integrity. The data product is broadcast by using satellites, digital broadcasting, mobile communication or the like. A user uses a BeiDou high-precision receiver/application terminal to receive the corrected data product and then perform computing, thus obtaining a real-time meter-level, decimeter-level, centimeter-level, or even millimeter-level positioning service.

The autonomous driving technology is a technology enabling a computer to autonomously and safely drive a motor vehicle without human intervention based on the collaboration between artificial intelligence, visual computing, radars, monitoring devices and global satellite navigation systems. It has been developing toward practical application in the 21st century and has a good prospect. Complex and diverse automobile driving environments and highly uncertain movement states of automobiles impose high requirements on the safety performance of autonomous driving.

Therefore, to solve the above problem, there is a need of a BeiDou-based grid augmentation autonomous driving multi-level warning system, to achieve collision prevention during autonomous driving.

SUMMARY

To solve the problems in the prior art, the present invention provides a BeiDou-based grid augmentation autonomous driving multi-level warning system. First, a user terminal receives satellite navigation signals from BeiDou and other constellations, performs dual pseudorange smoothing filtering at different times according to complexity of an ambient environment, and obtains a corrected pseudorange; then, an in-vehicle receiver receives BDS GBAS differential data and determines an integrated positioning error. In the process of calculating the error, the present invention introduces the concept of "environmental complexity", and the automobile comprehensively calculates a σ value including environmental complexity by using the numbers of automobiles and pedestrians currently within the range of the Vehicles internet system and relative distances. Second, the automobile calculates its protection level. Different from airborne user terminals, the moving speed of a car user changes significantly and irregularly. In addition, the automobile speed directly influences the safety of autonomous driving. Therefore, the present invention introduces a speed factor in the process of calculating the protection level, and either an unduly high or low speed will lead to an increase in the protection level of the automobile. Finally, three levels of warning limits are determined, wherein when the protection level exceeds a level-1 warning limit, a warning is sent to notify the driver to watch out; when the protection level exceeds a level-2 warning limit, the driver is instructed to find an opportunity to deactivate autonomous driving and manually take over the automobile; and when the protection level exceeds a level-3 warning limit, the level-2 warning operation is performed, and at the same time, a safety auxiliary feedback is provided, and the automobile actively honks and turns on emergency flashers to warn nearby vehicles and pedestrians to avoid, until the driver parks the automobile safely, or until the driver changes the driving state of the automobile back to normal.

The present invention provides a BeiDou-based grid augmentation autonomous driving multi-level warning system comprising a Beidou Satellite Ground-based Augmentation system, user terminals and a Vehicles internet system, wherein the Beidou Satellite Ground-based Augmentation system comprises Beidou grid reference stations, a data processing system and a data broadcast system; the user terminal comprises an in-vehicle receiver and a calculating chips; wherein the BeiDou-based grid augmentation autonomous driving multi-level warning system is running with the following steps:

gridding the land of mainland China and installing a BeiDou high-precision satellite navigation receiver as a Beidou grid reference station at each grid node;

the Beidou grid reference stations receiving the guiding signals from Beidou satellites or other satellites, inputting such signals into the data processing system to produce differential data, and the data broadcast system broadcasting said differential data to the in-vehicle receivers;

an in-vehicle receiver receiving satellite navigation signals from BeiDou and other constellations, performing dual pseudorange smoothing filtering at different times according to complexity of an ambient environment, and obtaining a corrected pseudorange;

an in-vehicle receiver also receiving the differential data from the BDS Ground-Based Augmentation System and determining an integrated positioning error, wherein in the process of calculating the error, the calculating chip of the user terminal comprehensively calculates a σ value including environmental complexity by using the numbers and relative distances of automobiles and pedestrians currently within the predetermined range obtained from the Vehicles internet system;

the calculating chips of the user terminal calculating its protection level, wherein a speed factor is introduced in the process of calculating the protection level; and determining multiple levels of warning limits, and sending a corresponding warning when the protection level exceeds a corresponding warning limit.

In a preferred embodiment of the present invention, the land of mainland China is classified and gridded, wherein 5°×5° wide-area division is performed nationwide, 1°×1° regional division is performed in cities, and 0.5°×0.5° regional division is performed in major cities.

In a preferred embodiment of the present invention, the user terminal and the Beidou grid reference stations perform 150 s and 50 s dual filtering at the same time, a smoothed pseudorange and differential information are obtained after the filtering, a corrected pseudorange is obtained after the differential information is corrected, and the corrected pseudorange is substituted into an observation equation to solve a location of the vehicle.

In a preferred embodiment of the present invention, after receiving differential information broadcast by four different nodes in a grid, a user terminal weights the differential information according to a location of the user in the grid.

In a preferred embodiment of the present invention, when handed over between grids of a same size, the user terminal in a range of 5 km from the handover edge simultaneously receives differential information from the two grids and performs averaging processing; and when handed over from a large grid area to a small grid area, the user immediately uses differential information of the small grid area; and when handed over from a small grid area to a large grid area, if a sum of distances from the user terminal to four stations in the small area is less than a sum of distances from the user terminal to each station in the large area, the user terminal still receives and uses differential information of the small grid area when entering a specific range of the large grid area.

In a preferred embodiment of the present invention, the Vehicles internet system make statistics about the numbers of automobiles and pedestrians within a circular range having a diameter of r and their relative distances to the local vehicle, calculates an average error by means of distance weighting, and finally outputs a σ value comprising an environmental error value.

In a preferred embodiment of the present invention, an environmental complexity uncertainty is calculated according to the numbers of automobiles and pedestrians within a specific range of an autonomous driving vehicle and their respective speeds as output by the Vehicles internet system.

In a preferred embodiment of the present invention, a pseudorange positioning uncertainty of the vehicle is defined as comprising total fault-free noise of four reference stations of the grid node, a tropospheric residual, ionospheric delay uncertainty, a receiver error, and environmental complexity uncertainty.

In a preferred embodiment of the present invention, the speed factor is introduced in the process of calculating the protection level, and the speed factor is defined as:

$$k_v = 2^{\left(\frac{v}{v_{aver}}-1\right)}, v \geq v_{aver}, k_v = 2^{-\left(\frac{v}{v_{aver}}-1\right)}, v < v_{aver};$$

wherein $v_{aver}$ is a reference speed, V is an automobile driving speed, and $k_v$ is the speed factor.

In a preferred embodiment of the present invention, three levels of warning limits are determined, wherein when the protection level exceeds a level-1 warning limit, a warning is sent to notify the driver to watch out; when the protection level exceeds a level-2 warning limit, the driver is instructed to find an opportunity to deactivate autonomous driving and manually take over the automobile; and when the protection level exceeds a level-3 warning limit, the level-2 warning operation is performed, and at the same time, a safety auxiliary feedback is provided, and the automobile actively honks and turns on emergency flashers to warn nearby vehicles and pedestrians to avoid, until the driver parks the automobile safely, or until the driver changes the driving state of the automobile back to normal.

The BeiDou-based grid augmentation autonomous driving multi-level warning system provided by the present invention has the following beneficial effects:

A grid division method for the BDS Ground-Based Augmentation System is provided, and a rule for inter-grid handover is specified, thus promoting the development of the BDS Ground-Based Augmentation System.

A protection level algorithm for autonomous driving of automobiles is provided, and a feasible solution is provided for the application of satellite navigation to autonomous driving, thus accelerating the popularization and development of autonomous driving technologies.

Three levels of warning limits are specified for automobiles, providing a reference for the future standardization of integrity of automobile autonomous driving.

The use of multi-level warning to alert the driver or take measures to avoid traffic accidents can reduce the occurrence of traffic accidents and reduce the loss of life and property.

It should be noted that the foregoing general description and the following detailed description are both exemplary and explanatory, and should not be used to limit the content that the present invention seeks to protect.

BRIEF DESCRIPTION OF THE DRAWINGS

More objectives, functions, and advantages of the present invention are illustrated through the following description of the implementation manners of the present invention with reference to the accompanying drawings.

DETAILED DESCRIPTION

With reference to the exemplary embodiments, the objectives and functions and the methods used to implement these objectives and functions of the present invention are described. However, the present invention is not limited to the exemplary embodiments disclosed in the following. The present invention may be implemented by using different forms. The specification substantially only helps a person skilled in the art to comprehensively understand specific details of the present invention.

The embodiments of the present invention are described below with reference to the accompanying drawings. The related technical terms should be well known to a person skilled in the art. In the accompanying drawings, the same reference numerals represent the same or similar components or the same or similar steps, unless otherwise described.

The following provides a detailed description of the contents of the present invention through embodiments.

As shown in FIG. 1, the present invention provides a BeiDou-based grid augmentation autonomous driving multi-level warning system comprising a Beidou Satellite Ground-based Augmentation system, user terminals and a Vehicles internet system, wherein the Beidou Satellite Ground-based Augmentation system comprises Beidou grid reference stations, a data processing system and a data broadcast system; the user terminal comprises an in-vehicle receiver and a calculating chips; wherein the BeiDou-based grid augmentation autonomous driving multi-level warning system is running with the following steps:

gridding the land of mainland China and installing a BeiDou high-precision satellite navigation receiver as a Beidou grid reference station at each grid node;

the Beidou grid reference stations receiving the guiding signals from Beidou satellites or other satellites, inputting such signals into the data processing system to produce differential data, and the data broadcast system broadcasting said differential data to the in-vehicle receivers;

an in-vehicle receiver receiving satellite navigation signals from BeiDou and other constellations, performing dual pseudorange smoothing filtering at different times according to complexity of an ambient environment, and obtaining a corrected pseudorange;

an in-vehicle receiver also receiving the differential data from the BDS Ground-Based Augmentation System and determining an integrated positioning error, wherein in the process of calculating the error, the calculating chip of the user terminal comprehensively calculates a σ value including environmental complexity by using the numbers and relative distances of automobiles and pedestrians currently within the predetermined range obtained from the Vehicles internet system;

the calculating chips of the user terminal calculating its protection level, wherein a speed factor is introduced in the process of calculating the protection level; and determining multiple levels of warning limits, and sending a corresponding warning when the protection level exceeds a corresponding warning limit.

Using mainland China as an example, the land of mainland China is gridded and a BeiDou high-precision satellite navigation receiver is installed at each grid node. 5°×5° wide-area division is performed nationwide, 1°×1° regional division is performed in cities, and 0.5°×0.5° regional division is performed in major cities (Beijing, Shanghai, Shenzhen, Guangzhou, etc.). A grid with varying densities is formed nationwide after division. A user terminal (vehicle/automobile) at different locations in the grid receives, from a node, different differential information, which is used for differential correction of the user. Finally, positioning precise up to millimeter-level can be achieved.

The in-vehicle receiver and the Beidou grid reference stations perform 150 s and 50 s dual filtering at the same time, a smoothed pseudorange and differential information are obtained after the filtering, a corrected pseudorange is obtained after the differential information is corrected, and the corrected pseudorange is substituted into an observation equation to solve a location of the vehicle.

An Vehicles internet system make statistics about the numbers of automobiles and pedestrians within a circular range having a diameter of r and their relative distances to the local vehicle (user terminal), calculates an average error by means of distance weighting, and finally outputs a σ value comprising an environmental error value.

A protection level of the automobile is calculated. As the automobile drives horizontally on road segments, the protection level of the automobile in the vertical direction is not of much significance, an anti-collision algorithm only needs to take into consideration the protection level of the automobile in the horizontal direction. A protection level algorithm for the automobile needs to take into consideration the speed of the automobile. The automobile uses an average speed of all other automobiles within a range as a reference, and the protection level of the automobile will be increased if the speed of the automobile is much greater or less than the reference speed.

Three levels of warning limits are determined. The warning limit is correlated to the speed of the automobile. In a normal state, the human reaction time is about 0.3 s; the reaction time to complex choices is 1 s; the reaction time to complex judgment and perception is up to 3 s. The three reaction times are multiplied by the current vehicle speed to obtain three levels of warning limits, where the warning limit should not be less than 10 m (about two times the vehicle length).

The BeiDou-based grid augmentation autonomous driving multi-level warning system of the present invention is illustrated in the following steps:

Multi-Level Grid Augmentation

Figure 2:
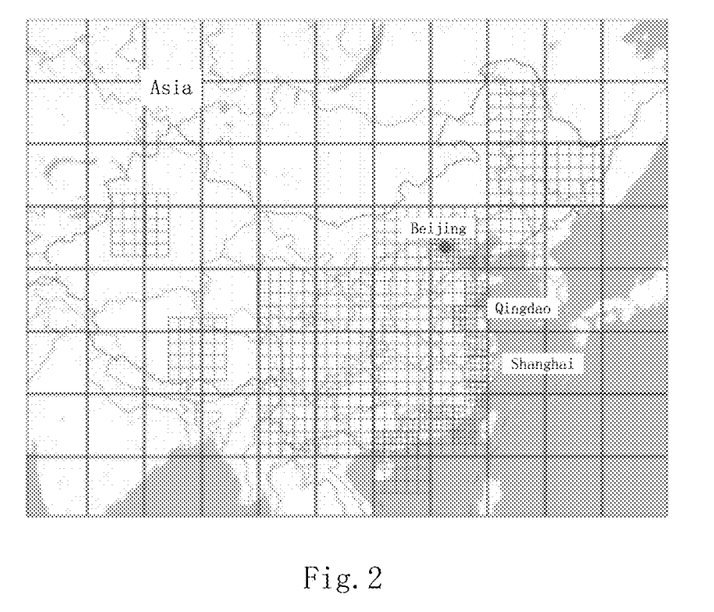
FIG. 2 shows a schematic diagram of grid division of the Beidou grid reference stations.

The land of mainland China is gridded and BeiDou high-precision satellite navigation receivers are installed at each grid node as the Beidou grid reference stations, in order to receive the guiding signals from Beidou Satellites or other satellites. FIG. 2 shows a schematic diagram of grid division of the Beidou grid reference stations. The land of mainland China is classified and gridded, wherein 5°×5° wide-area division is performed nationwide, 1°×1° regional division is performed in cities, and 0.5°×0.5° regional division is performed in major cities.

5°×5° wide-area division is performed nationwide, 1°×1° regional division is performed in cities, and 0.5°×0.5° regional division is performed in major cities (Beijing, Shanghai, Shenzhen, Guangzhou, etc.). One ground-based augmentation station is provided at each node, each station having M receivers.

After receiving differential information broadcast by four different nodes in the grid, the user terminal (vehicle/automobile) weights the differential information according to a location of the user in the grid.

Figure 3:
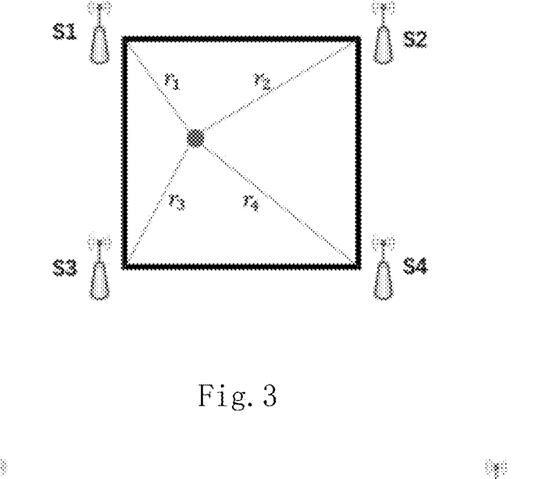
FIG. 3 shows a schematic diagram of calculating comprehensive differential information according to the present invention.

In the grid, the user terminal (vehicle/automobile) receives differential information from ground-based augmentation stations at four grid nodes. The differential information is highly region-specific, and can reflect errors of navigation ionosphere and troposphere of grid points. After receiving differential information broadcast by four nodes, the user weights the differential information according to a location of the user in the grid, to finally obtain comprehensive differential information of the location of the user. FIG. 3 shows a schematic diagram of calculating comprehensive differential information according to the present invention. The smaller the distance between the user terminal (vehicle/automobile) and the reference station is, the stronger the error correlation is. The comprehensive differential information of the user terminal is specified as:

$$\Delta n = \sum_{i=1}^{4} \left(1 - \frac{r_i}{\sum_{k=1}^{4} r_k}\right) \cdot \Delta n_i$$

where $r_i$ is the distance between the $i^{th}$ station and the user terminal, is a total distance from the user terminal to four stations, and $\Delta n_i$ is a term in an differential error and may be an ionospheric error, a tropospheric error, or the like. $\Delta n$ is comprehensive differential information of a certain term finally calculated by the user terminal.

Figure 4:
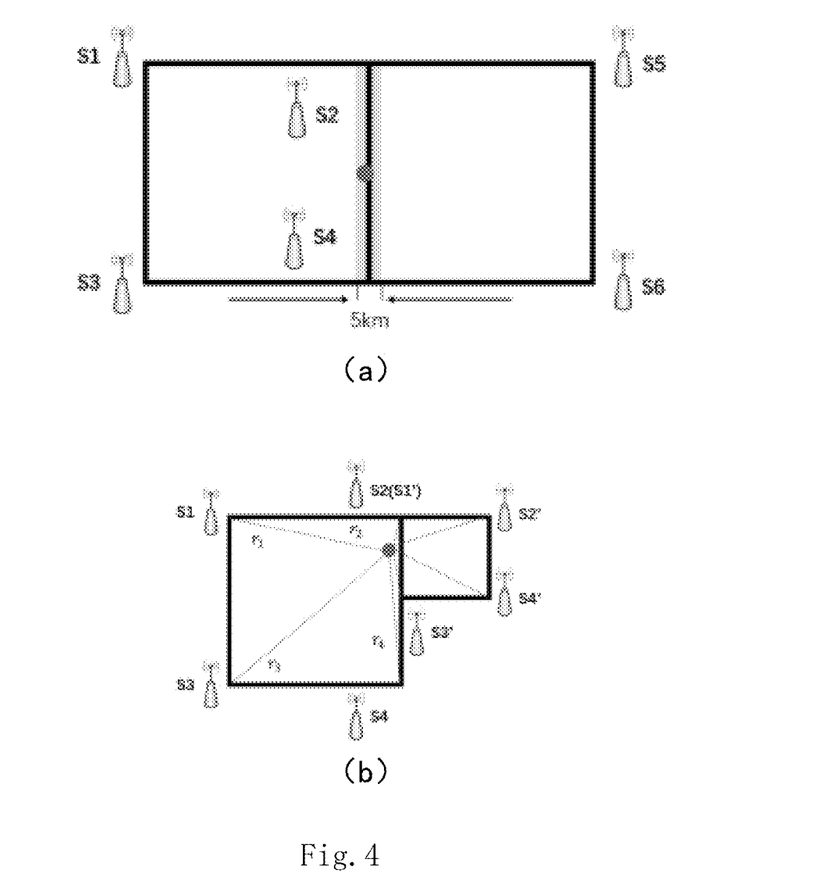
FIG. 4 shows a schematic diagram of handover of a user terminal between different grid areas according to the present invention.

According to the present invention, when the user terminal is handed over between different grid areas, the Beidou grid reference stations and differential information that are used by the user also change. FIG. 4 shows a schematic diagram of handover of a user terminal between different grid areas according to the present invention, where (a) is a schematic diagram of handover between grid areas of a same size, and (b) is a schematic diagram of handover from a small grid area to a large grid area. As shown in (a) in FIG. 4, when handed over between grid areas of a same size, the user terminal in a range of 5 km (which takes about 5 minute drive) from the handover edge simultaneously receives and uses differential information from the two grids and performs averaging processing:

$$\overline{\Delta n} = \frac{\Delta n + \Delta n'}{2}.$$

where $\Delta n$ and $\Delta n'$ are respectively comprehensive differential information of two grid areas.

When handed over from a large grid area to a small grid area, the user immediately uses differential information of the small grid area. When the user is handed over from a large grid area to a small grid area, the user immediately uses differential information of the small grid area because the differential information of the small grid area has higher precision.

As shown in (b) in FIG. 4, when the user is handed over from a small grid area to a large grid area, differential information of the small area may be better than differential information of the large area.

If a sum of distances from the user to four stations in the small area is less than a sum of distances from the user terminal to each station in the large area, the user terminal still receives and uses differential information of the small grid area when entering a specific range of the large grid area.

When the above condition is satisfied, the user terminal still receives and uses the differential information of the small grid area. The above condition is expressed in the following manner:

$$\sum_{m=1}^{4} r_m \geq \sum_{n=1}^{4} r_n$$

where $r_m$ is the distance from the user terminal to each station in the large grid area, and $r_n$ is the distance from the user terminal to each station in the small grid area.

Once the sum of the distances from the user terminal to the four stations in the small area is less than the sum of the distances from the user terminal to each station in the large area, it indicates that the user terminal is more correlated to the large grid than to the small grid area, and the differential information of the large grid area is more accurate. In this case, the user terminal changes to use the differential information of the large grid area.

Dual Filtering Performed by Stations and Vehicles

An in-Vehicle receiver receives satellite navigation signals from BeiDou and other constellations, performing dual pseudorange smoothing filtering at different times according to complexity of an ambient environment, and obtains a corrected pseudorange.

An in-vehicle receiver and a Beidou grid reference station perform 150 s and 50 s dual filtering at the same time, a smoothed pseudorange and differential information are obtained after the filtering, a corrected pseudorange is obtained after the differential information is corrected, and the corrected pseudorange is substituted into an observation equation to solve a location of the vehicle.

The autonomous driving environment for automobiles is rather complex: severe blocking in urban environments and more severe multipath effect. The receiver is easily affected by various noise sources in the process of observing the pseudorange and the carrier phase. The pseudorange has a problem of unduly high random noise, and the carrier phase has a problem of ambiguity of whole cycles. Therefore, dual smoothing filtering can be performed on an observed pseudorange value by using an observed carrier phase value, to improve the precision of the observed pseudorange value. Hatch filtering is a typical method for smoothing the pseudorange by using the carrier phase:

$$P_n = \alpha P + (1 - \alpha)\left(P_{n-1} + \frac{\lambda}{2\pi}(\phi_n - \phi_{n-1})\right)$$

where P is an observed pseudorange value, $P_n$ and $P_{n-1}$ are respectively a smoothed pseudorange and a pseudorange at a previous moment; $\lambda$ is a carrier wavelength; $\phi_n$ and $\phi_{n-1}$ are respectively a current carrier phase and a carrier phase at a previous moment; and $\alpha$ is a filter weight coefficient, and equals a sampling interval divided by a filter time constant $\tau$.

Figure 5:
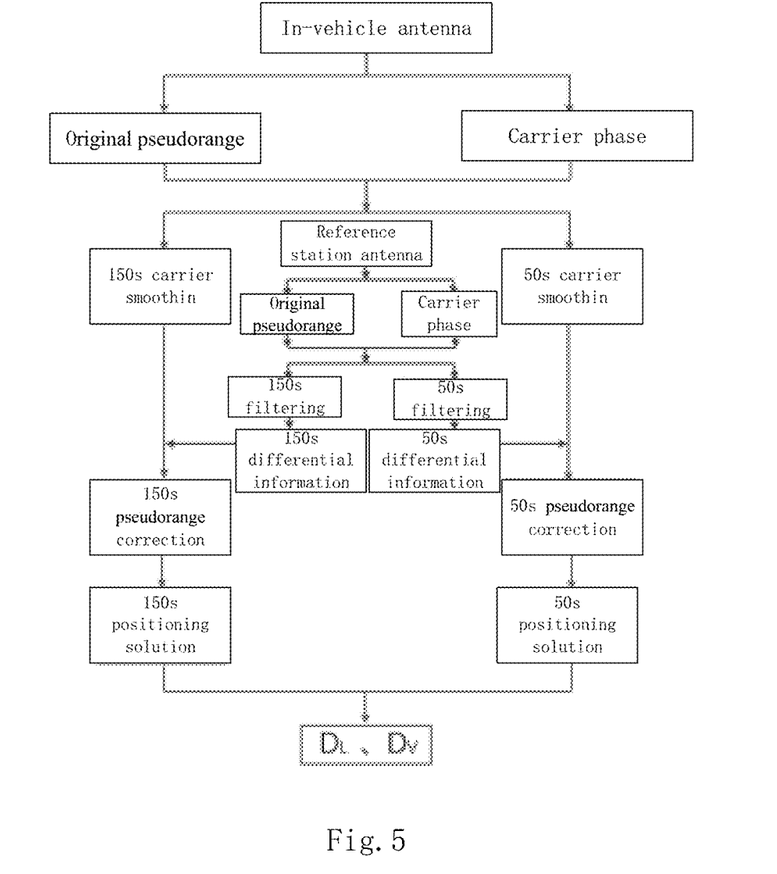
FIG. 5 shows a schematic diagram of dual filtering performed by a vehicle and a reference station according to the present invention.

Considering the complexity of the automobile driving environment, it is required that the in-vehicle receiver performs 150 s and 50 s dual filtering at the same time, a smoothed pseudorange is obtained after the filtering, a corrected pseudorange is obtained after differential correction, and the corrected pseudorange is substituted into an observation equation to solve a location of the vehicle. Meanwhile, the reference station also performs dual filtering on a received pseudorange to obtain a more accurate differential correction amount. FIG. 5 shows a schematic diagram of dual filtering performed by a vehicle and a reference station according to the present invention. For dual filtering performed by the station and the vehicle, 150 s and 50 s carrier phase smoothing filtering is performed, and information such as a positioning solution is finally output. The information can be used for calculating the protection level.

Error Estimation

An in-vehicle receiver receives BDS Ground-Based Augmentation System differential data and determines an integrated positioning error, wherein in the process of calculating the error, the automobile comprehensively calculates a σ value including environmental complexity by using the numbers of automobiles and pedestrians currently within the range of the Vehicles internet system and relative distances.

The Vehicles internet system make statistics about the numbers of automobiles and pedestrians within a circular range having a diameter of r and their relative distances to the local vehicle (user terminal), calculates an average error by means of distance weighting, and finally outputs a σ value comprising an environmental error value.

When the in-vehicle receiver calculates pseudorange domain noise, the concept of "environmental complexity" is introduced in the present invention. Theoretically, the larger the number of other vehicles and pedestrians near the vehicle is, the higher the environmental complexity will be. The vehicle may be located in a densely populated urban area, and may experience a severer multipath effect and electromagnetic interference, eventually leading to a larger pseudorange domain positioning error.

Environmental complexity uncertainty is calculated according to the numbers of automobiles and pedestrians within a specific range of an autonomous driving vehicle and their respective speeds as output by the Vehicles internet system. To calculate the environmental complexity, first, the automobile uses the Vehicles internet system to output the number m of automobiles and the number n of pedestrians currently within a circular range having a diameter of r, speeds $v_p$ and relative distances $d_p$ of vehicles p, and speeds $v_q$ and relative distances $d_q$ of pedestrians q. Definition:

$$r = 10 \cdot v$$

where v is a driving speed of a target vehicle, measured in m/s, and the smallest value of r is set to 100 m (vision field of the driver). Definition:

$$\sigma_{envir}^2 = \frac{k_{car}}{m} \sum_{p=1}^{m} \frac{v_p}{d_p} + \frac{k_{people}}{n} \sum_{q=1}^{n} \frac{v_q}{d_q} \cdot (m \cdot s)$$

In the formulas, impact of other vehicles and pedestrians on the environment of the autonomous driving vehicle is respectively calculated, where a faster object has greater impact on the environment of the vehicle, and a closer object has greater impact on the environment of the vehicle. $k_{car}$ and $k_{people}$ are constant coefficients for distinguishing different degrees to which vehicles and pedestrians affect the environment. In the present invention, $k_{car}=10^{-2}$, and because pedestrians usually move slowly, $k_{people}=10^{-1}$. $\sigma_{envir}$ is only correlated to the driving environment of the target vehicle, and is irrelevant to positioning satellites.

Pseudorange positioning uncertainty of the vehicle is defined as comprising total fault-free noise of four reference stations of the grid node, a tropospheric residual, ionospheric delay uncertainty, a receiver error, and environmental complexity uncertainty.

A total error of the pseudorange domain is defined as:

$$\sigma_i^2 = \sigma_{station\_i}^2 + \sigma_{tropo,i}^2 + \sigma_{iono,i}^2 + \sigma_{air,i}^2 + \sigma_{envir}^2;$$

where, $\sigma_{station\_i}^2$ is total fault-free noise of the $i^{th}$ satellite to four reference stations of the grid.

$$\sigma_{station\_i}^2 = \sum_{m=1}^{4} \sigma_{B\_m}^2 \frac{(M-1)(N-1)}{N}$$

M and N are respectively the number of reference receivers and the number of satellites of the reference station, and $\sigma_{B\_m}^2$ is B-value variance of the $m^{th}$ reference station.

$\sigma_{tropo,i}^2$ is a comprehensive tropospheric residual of the four reference stations to the $i^{th}$ satellite, and for the $m^{th}$ reference station:

$$\sigma_{tropo,i\_m}(\theta) = \sigma_N h_0 \frac{10^{-6}}{\sqrt{0.002 + \sin^2(\theta)}} \left(1 - e^{\frac{-\Delta h}{h_0}}\right) \Delta h$$

$\sigma_N$ is refraction uncertainty of the reference station, $\Delta h$ is a height difference between the user terminal and the reference station, $h_0$ is the atmospheric scale height, and $\theta$ is an angle of elevation from the reference receiver to the satellite i.

$\sigma_{iono,i}^2$ is comprehensive ionospheric delay uncertainty of the four reference stations to the $i^{th}$ satellite, and for the $m^{th}$ reference station:

$$\sigma_{iono,i\_m} = F_{pp} \times \sigma_{vert\_iono\_gradient} \times (x_{car} + 2 \times \tau \times v_{car})$$

$F_{pp}$ is an obliquity factor of satellite i, $\sigma_{vert\_iono\_gradient}$ is a vertical gradient of ionosphere, $x_{car}$, is the distance between the vehicle and the reference station, $v_{car}$ is the speed of the vehicle, and $\tau$ is a filtering constant.

$\sigma_{air,i\_150}^2 = \sqrt{150/50} \cdot \sigma_{air,i\_50}^2$ is a comprehensive receiver error of the four reference stations to the $i^{th}$ satellite; for the $m^{th}$ reference station:

$$\sigma_{air,i\_m} = \sqrt{\sigma_{receiver}^2(\theta_i) + \sigma_{multipath}^2(\theta_i)}$$

$\sigma_{receiver}^2(\theta_i)$ and $\sigma_{multipath}^2(\theta_i)$ are respectively receiver thermal noise and multipath noise.

$\sigma_{air,i}^2$ of 50 s filtering and 150 s filtering differs, where $\sigma_{air,i\_50}^2 = \sqrt{150/50} \cdot \sigma_{air,i\_150}^2$.

$\sigma_{envir}^2$ is the environmental complexity uncertainty defined above.

In the process of calculating the protection level, the user terminal simultaneously receives differential information from four reference stations of the grid, performs weighted calculation based on the method described above to obtain final comprehensive differential information of a term, performs addition to obtain total noise of the pseudorange domain. Thus, the protection level of the vehicle can be calculated.

Calculation of Protection Level

The automobile calculates its protection level, wherein a speed factor is introduced in the process of calculating the protection level.

The speed of the user terminal directly influences the safety performance. The present invention introduces a speed factor in the process of calculating the protection level, and either an unduly high or low speed will lead to an increase in the protection level of the automobile. In aviation, using the protection level in the horizontal direction as an example, its value is the larger one of $HPL_{H0}$ calculated under H0 (fault-free assumption, i.e., assuming that none of GBAS reference receivers is faulty) and $HPL_{H1}$ calculated under H1 (single-receiver-fault assumption, i.e., assuming that one of GBAS reference receivers is faulty). That is:

$$HPL = \max\{HPL_{H0}, HPL_{H1}\}$$

wherein, $$HPL_{H0} = K_{ffmd}\sqrt{\sum_{i=1}^{N} S_{vert,i}^2 \sigma_i^2} + D_L$$

$$HPL_{H1} = \max(LPL_{H1,j}) + D_L$$

$$HPL_{H1,j} = \left|\sum_{i=1}^{N} S_{vert,i} B_{i,j}\right| + K_{md}\sqrt{\sum_{i=1}^{N} S_{vert,i}^2 \sigma_{i,H1}^2}$$

In the formula, $K_{ffmd}$ and $K_{md}$ are respectively a fault-free missed detection factor and a single-fault missed detection factor. A missed detection factor of an airplane is determined by the number of reference receivers and the advanced level. It is defined that for 150 s filtering, $D_L$ is 0; and for 50 s filtering, $D_L$ is the difference between projections of positioning results of 50 s filtering and 150 s filtering in the horizontal direction of the pseudorange domain. $B_{i,j}$ is B value of the $i^{th}$ satellite relative to the $j^{th}$ reference receiver. $\sigma_{i,H1}^2$ is a total error of ground stations after a single faulty receiver is rectified. $a_{num\_fault}$ is the number of faulty receivers in the reference station at the grid point n. For a faulty reference station, $a_{num\_fault}$ is 1; for a fault-free reference station $a_{num\_fault}$ is 0:

$$\sigma_{i,H1}^2 = \sum_{n=1}^{4} \frac{M_n \cdot \sigma_{station,i\_n}^2}{M_n - a_{num\_fault}} + \sigma_{tropo,i}^2 + \sigma_{iono,i}^2 + \sigma_{air,i}^2 + \sigma_{envir}^2.$$

In the present invention, the following improvements are made on the calculation of the protection level of the autonomous driving vehicle:

(1) Missed Detection Factor

Figure 6:
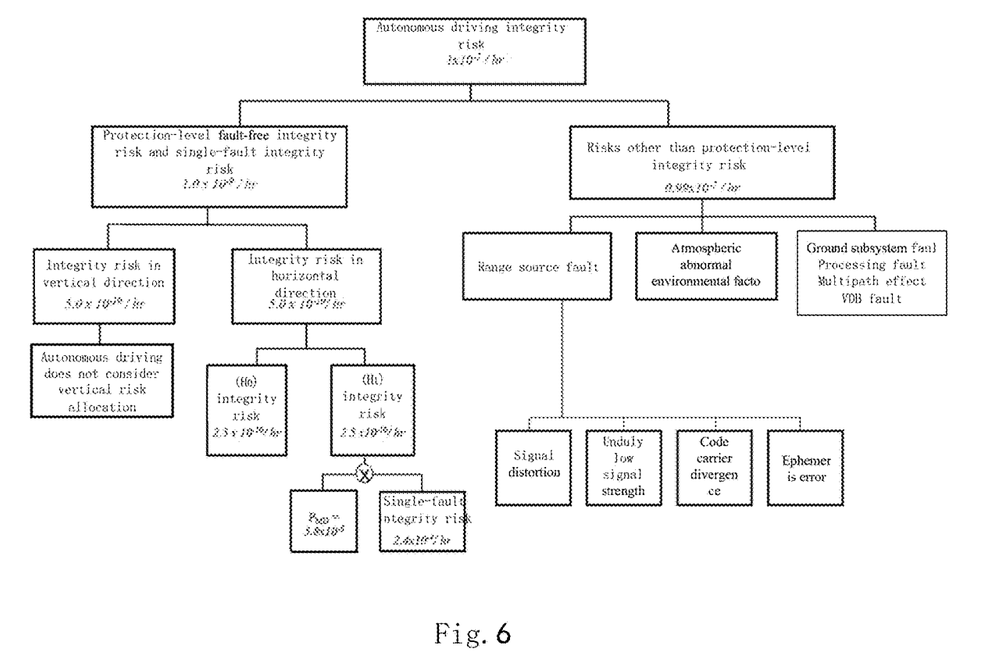
FIG. 6 shows a schematic diagram of integrity risk allocation of autonomous driving according to the present invention.

Considering the requirements of autonomous driving on the safety performance, integrity risks of autonomous driving are allocated, and the integrity risk of autonomous driving is set to 1×10-7/hour. FIG. 6 shows a schematic diagram of integrity risk allocation of autonomous driving according to the present invention. According to the integrity risk allocation shown in FIG. 6, missed detection probability $P_{MD} = 5.8 \times 10^{-8}$. A missed detection coefficient can be calculated according to the missed detection probability:

$$K_{ffmd} = Q^{-1}\left(\frac{P_{MD\_FF}}{2}\right)$$

$$K_{md} = Q^{-1}(P_{MD\_FF})$$

Q is a cumulative distribution function of zero mean Gaussian distribution:

$$Q(x) = \frac{1}{\sqrt{2\pi}} \int_x^{+\infty} e^{\frac{u^2}{2}} du$$

Likewise, the missed detection probability is thus calculated as specified. Table 1 shows missed detection coefficients for autonomous driving.

TABLE 1

| Missed detection coefficients for autonomous driving | |
|---|---|
| $K_{ffmd}$ | $K_{md}$ |
| 10 | 5.3 |

The above missed detection coefficients for autonomous driving are only correlated with the filtering time.

(2) Define a Speed Factor $H_1$

A speed factor is introduced in the process of calculating the protection level, and the speed factor is defined as:

$$k_v = 2^{\left(\frac{v}{v_{aver}} - 1\right)}, v \geq v_{aver}, k_v = 2^{-\left(\frac{v}{v_{aver}} - 1\right)}, v < v_{aver};$$

wherein $v_{aver}$ is a reference speed, V is an automobile driving speed, and $k_v$ is the speed factor.

The present invention further takes into consideration the impact of the vehicle speed on the safety performance of the automobile. On either expressways or urban roads, an unduly high speed leads to a longer braking distance, causing a traffic accident; a low speed may cause rear-end collision. In other words, both overspeed and underspeed can be dangerous. However, theoretically, overspeed is more dangerous than underspeed.

An average speed of automobiles within a circular range having a diameter of r is used as a reference speed. Assuming that there are m automobiles within the range and the speed of the $i^{th}$ automobile is $v_i$, the average speed of automobiles within the range is defined as the reference speed $v_{aver}$ of the target vehicle, that is:

$$v_{aver} = \frac{1}{m}\sum_{i=1}^{m} v_i$$

where m≥5, that is, the average speed calculated when there are at least five vehicles within the range is considered to be meaningful. When m≤5, the road segment on which the vehicle is currently driving is determined according to the positioning result and the Vehicles internet system, and approximately the average speed limit of each road segment is used as the reference speed. Table 2 shows reference speeds of road segments.

TABLE 2

| Reference speeds of road segments | |
|---|---|
| Road segment | Reference speed (km/h) |
| Urban road | 30 |
| Suburban highway | 50 |
| Expressway | 100 |

Overspeed is more dangerous than underspeed, and higher overspeed is more likely to cause accidents. The speed factor may be calculated by using an exponential function. The speed factor is defined as:

$$k_v = 2^{\left(\frac{v}{v_{aver}}-1\right)}, v \geq v_{aver}$$

$$k_v = 2^{-\left(\frac{v}{v_{aver}}-1\right)}, v < v_{aver}$$

When the protection level of the automobile is calculated:

$$LPL_{car} = k_v \cdot LPL_{envir}$$

That is, when the speed of the autonomous driving vehicle equals the average speed of vehicles within the range, the speed factor is 1, and the protection level of the automobile does not change; when the speed of the autonomous driving vehicle is close to the average speed of vehicles, the speed factor is small; when overspeed is twice the reference speed, the protection level is doubled; when the speed ratio increases, the protection level increases exponentially; when the automobile is underspeed, the value of the speed factor remains small. Underspeed has less impact on the protection level than overspeed does.

Determining of Multiple Levels of Warning Limits

Hereinbefore, the calculation of the protection level of the autonomous driving automobile has been carried out according to the present invention. Multiple levels of warning limits are determined, and a corresponding warning is sent when the protection level exceeds a corresponding warning limit.

Current autonomous driving technologies are mainly used to assist manned driving, and are not truly unmanned driving. As a technology closely related to life safety, the system must be able to send a warning when autonomous driving is facing great risk, to instruct the driver to observe the vehicle driving status and find an opportunity to deactivate autonomous driving and manually take over the automobile. At high risk, the automobile actively takes some measures to alert the ambient environment, to reduce the probability of risks. In view of the above, three levels of warning limits are defined in the present invention.

Figure 7:
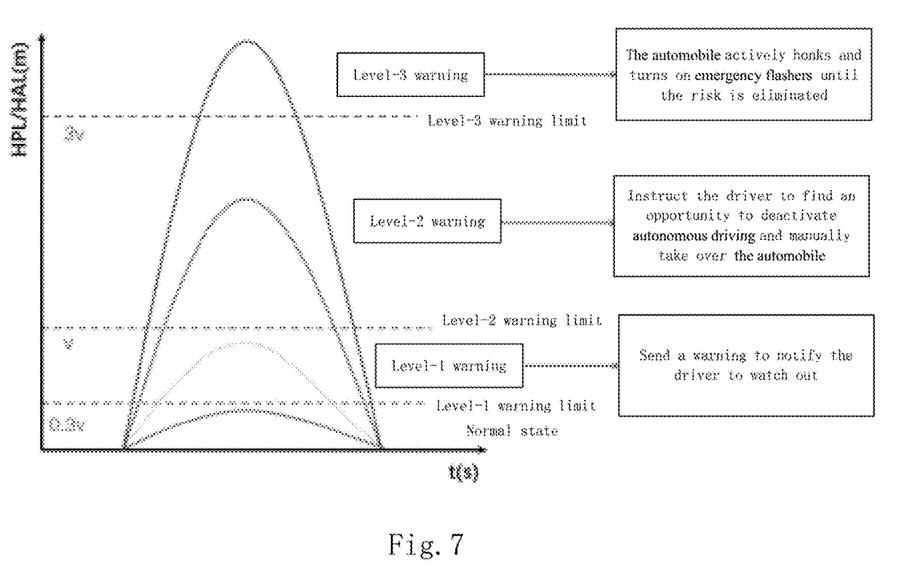
FIG. 7 shows a flowchart of autonomous driving multi-level warning according to the present invention.

In an embodiment, as shown in FIG. 7 which is a flowchart of autonomous driving multi-level warning, three levels of warning limits are determined, wherein when the protection level exceeds a level-1 warning limit, a warning is sent to notify the driver to watch out; when the protection level exceeds a level-2 warning limit, the driver is instructed to find an opportunity to deactivate autonomous driving and manually take over the automobile; and when the protection level exceeds a level-3 warning limit, the level-2 warning operation is performed, and at the same time, a safety auxiliary feedback is provided, and the automobile actively honks and turns on emergency flashers to warn nearby vehicles and pedestrians to avoid, until the driver parks the automobile safely, or until the driver changes the driving state of the automobile back to normal.

The purpose of setting the warning limits for autonomous driving is to perform proper operations when the protection level of the automobile exceeds the limit, so as to prevent accidents. Therefore, the setting of the warning limit for the automobile is correlated to the speed and the reaction time of the driver. In a normal state, the human reaction time is about 0.3 s; the reaction time to complex choices is 1 s; the reaction time to complex judgment and perception is up to 3 s. The three reaction times are multiplied by the current vehicle speed to obtain three levels of warning limits. In a complex environment, for example, traffic jam or slow traffic, the vehicle speed may be very low or even 0. Therefore, the warning limit is set to be no less than 10 m (about two times the vehicle length), as shown in Table 3.

| Warning level | Warning limit |
| --- | --- |
| Level-1 warning | 0.3 v |
| Level-2 warning | v |
| Level-3 warning | 3 v |

According to the relationship between protection levels and warning limits, when the protection level exceeds a level-1 warning limit, the autonomous driving system sends a warning to notify the driver to observe the driving environment; when the protection level exceeds a level-2 warning limit, the system instructs the driver to find an opportunity to deactivate the autonomous driving system and manually take over the automobile, until the risk is eliminated; and when the protection level exceeds a level-3 warning limit, the level-2 warning operation is performed, and at the same time, a safety auxiliary feedback is provided, and the automobile actively honks and turns on emergency flashers to warn nearby vehicles and pedestrians to avoid, until the driver parks the automobile safely, or until the driver changes the driving state of the automobile back to normal. After a braking system of the automobile is properly coupled with the satellite navigation system, the braking system can even be directly driven to perform an emergency stop operation.

The BeiDou-based grid augmentation autonomous driving multi-level warning method provided by the present invention has the following beneficial effects:

A grid division method for the BDS Ground-Based Augmentation System is provided, and a rule for inter-grid handover is specified, thus promoting the development of the BDS Ground-Based Augmentation System.

A protection level algorithm for autonomous driving of automobiles is provided, and a feasible solution is provided for the application of satellite navigation to autonomous driving, thus accelerating the popularization and development of autonomous driving technologies.

Three levels of warning limits are specified for automobiles, providing a reference for the future standardization of integrity of automobile autonomous driving.

The use of multi-level warning to alert the driver or take measures to avoid traffic accidents can reduce the occurrence of traffic accidents and reduce the loss of life and property.

The present invention provides a grid division method for the BDS Ground-Based Augmentation System and an inter-grid handover scheme. Also, a protection level algorithm for autonomous driving of automobiles is provided, and the factors specific only to automobile driving, including environmental complexity noise and vehicle speed, are introduced in the calculation of the protection level of the automobile. Three levels of warning limits are specified for automobiles. The use of three-level warning to alert the driver or take measures to avoid traffic accidents can reduce the loss of life and property. A reference is provided for the future standardization of integrity of automobile autonomous driving. After the networking of BeiDou 3 is completed, the function of the BeiDou navigation system becomes more perfect. The BDS Ground-Based Augmentation System networking project is also ongoing. The present patent provides a feasible solution for the application of the BDS Ground-Based Augmentation System to autonomous driving, thus accelerating the popularization and development of autonomous driving technologies.

With reference to the description and practice of the present invention disclosed herein, other embodiments of the present invention can be easily conceived of and understood by a person skilled in the art. The description and embodiments are only considered to be exemplary, and the actual scope and theme of the present invention are defined by the claims.

What is claimed is:

1. A BeiDou-based grid augmentation autonomous driving multi-level warning system comprising:

a BeiDou Satellite Ground-based Augmentation system, user terminals and a Vehicles internet system, wherein the BeiDou Satellite Ground-based Augmentation system comprises BeiDou grid reference stations, a data processing system and a data broadcast system, and the user terminal comprises an in-vehicle receiver and a calculating chip;

wherein the BeiDou-based grid augmentation autonomous driving multi-level warning system is running with the following steps:

gridding the land of mainland China and installing a BeiDou high-precision satellite navigation receiver as a BeiDou grid reference station at each grid node;

the BeiDou grid reference stations receiving the guiding signals from BeiDou satellites or other satellites, inputting such signals into the data processing system to produce differential data, and the data broadcast system broadcasting said differential data to the in-vehicle receivers;

an in-vehicle receiver receiving satellite navigation signals from BeiDou and other constellations, performing dual pseudorange smoothing filtering at different times according to complexity of an ambient environment, and obtaining a corrected pseudorange;

an in-vehicle receiver also receiving the differential data from the BDS Ground-Based Augmentation System and determining an integrated positioning error, wherein in the process of calculating the error, the calculating chip of the user terminal comprehensively calculates a σ value including environmental complexity by using the numbers and relative distances of automobiles and pedestrians currently within the predetermined range obtained from the Vehicles internet system;

the calculating chip of the user terminal calculating its protection level, wherein a speed factor is introduced in the process of calculating the protection level; and determining multiple levels of warning limits, and sending a corresponding warning when the protection level exceeds a corresponding warning limit;

wherein the Vehicles internet system makes statistics about the numbers of automobiles and pedestrians within a circular range having a diameter of r and their relative distances to the local vehicle, calculates an average error by means of distance weighting, and finally outputs the σ value including environmental complexity;

wherein a pseudorange positioning uncertainty of the vehicle is defined as comprising total fault-free noise of four reference stations of the grid node, a tropospheric residual, ionospheric delay uncertainty, a receiver error, and an environmental complexity uncertainty;

wherein a total error of a pseudorange domain is defined as:

$$\sigma_1^2 = \sigma_{station\_i}^2 + \sigma_{tropo,i}^2 + \sigma_{iono,i}^2 + \sigma_{air,i}^2 + \sigma_{envir}^2;$$

wherein $\sigma_{station\_i}^2$ is total fault-free noise of an $i^{th}$ satellite to the four reference stations, $\sigma_{tropo,i}^2$ is a comprehensive tropospheric residual of the four reference stations to the $i^{th}$ satellite, $\sigma_{iono,i}^2$ is a comprehensive ionospheric delay uncertainty of the four reference stations to the $i^{th}$ satellite, $\sigma_{air,i}^2$ is a comprehensive receiver error of the four reference stations to the $i^{th}$ satellite, and $\sigma_{envir}^2$ is the environmental complexity uncertainty; and wherein when handed over between grids of a same size, the user terminal in a range of 5 km from the handover edge simultaneously receives differential information from the two grids and performs averaging processing; and when handed over from a large grid area to a small grid area, the user immediately uses differential information of the small grid area;

and when handed over from a small grid area to a large grid area, if a sum of distances from the user terminal to four stations in the small area is less than a sum of distances from the user terminal to four stations in the large area, the user terminal still receives and uses differential information of the small grid area when entering a specific range of the large grid area.

2. The system according to claim 1, wherein the land of mainland China is classified and gridded, wherein 5°×5° wide-area division is performed nationwide, 1'×1° regional division is performed in cities, and 0.5°×0.5° regional division is performed in major cities.

3. The system according to claim 1, wherein the user terminal and the BeiDou grid reference stations perform 150 s and 50 s dual filtering at the same time, a smoothed pseudorange and differential information are obtained after the filtering, a corrected pseudorange is obtained after the differential information is corrected, and the corrected pseudorange is substituted into an observation equation to solve a location of the vehicle.

4. The system according to claim 1, wherein after receiving differential information broadcast by four different nodes in a grid, a user terminal weights the differential information according to a location of the user in the grid.

5. The system according to claim 1, wherein an environmental complexity uncertainty used in the process of calculating the protection level is calculated according to the numbers of automobiles and pedestrians within a specific range of an autonomous driving vehicle and their respective speeds as output by the Vehicles internet system.

6. The system according to claim 1, wherein the speed factor is introduced in the process of calculating the protection level, and the speed factor is defined as:

$$k_v = 2^{\left(\frac{v}{v_{aver}}-1\right)}, v \geq v_{aver}, k_v = 2^{-\left(\frac{v}{v_{aver}}-1\right)}, v < v_{aver};$$

wherein $v_{aver}$ is a reference speed, v is an automobile driving speed, and kv is the speed factor.

7. The system according to claim 1, wherein three levels of warning limits are determined, wherein when the protection level exceeds a level-1 warning limit, a warning is sent to notify the driver to watch out; when the protection level exceeds a level-2 warning limit, the driver is instructed to find an opportunity to deactivate autonomous driving and manually take over the automobile; and when the protection level exceeds a level-3 warning limit, the level-2 warning operation is performed, and at the same time, a safety auxiliary feedback is provided, and the automobile actively honks and turns on emergency flashers to warn nearby vehicles and pedestrians to avoid, until the driver parks the automobile safely, or until the driver changes the driving state of the automobile back to normal.

\* \* \* \* \*